Fig. 1

INVENTOR.
GEORGE F. WIKLE
AGENT.

Feb. 7, 1956 G. F. WIKLE 2,733,766
BIAS CUTTER
Filed Nov. 1, 1950 7 Sheets-Sheet 2

Fig. 3
Fig. 2

INVENTOR.
GEORGE F. WIKLE
BY James J. Long
AGENT.

Fig. 4

INVENTOR.
GEORGE F. WIKLE
BY James J. Long
AGENT.

Feb. 7, 1956  G. F. WIKLE  2,733,766
BIAS CUTTER
Filed Nov. 1, 1950  7 Sheets-Sheet 4

INVENTOR.
GEORGE F. WIKLE
BY James J. Long
AGENT.

Feb. 7, 1956 — G. F. WIKLE — 2,733,766
BIAS CUTTER
Filed Nov. 1, 1950 — 7 Sheets-Sheet 5

Fig. 7

INVENTOR.
GEORGE F. WIKLE
BY James J. Long
AGENT.

Feb. 7, 1956    G. F. WIKLE    2,733,766
BIAS CUTTER
Filed Nov. 1, 1950    7 Sheets-Sheet 6

INVENTOR.
GEORGE F. WIKLE
BY James J. Long
AGENT.

Feb. 7, 1956

G. F. WIKLE 2,733,766

BIAS CUTTER

Filed Nov. 1, 1950

INVENTOR.
GEORGE F. WIKLE
BY
James J. Long
AGENT.

United States Patent Office
2,733,766
Patented Feb. 7, 1956

2,733,766
BIAS CUTTER

George F. Wikle, Detroit, Mich., assignor to United States Rubber Company, New York, N. Y., a corporation of New Jersey Application November 1, 1950, Serial No. 193,323

6 Claims. (Cl. 164—34)

This invention relates to an improved cutting mechanism, and more particularly it relates to an improved bias cutter for cutting a continuous length of rubberized tire fabric into strips of definite width.

One object of the invention is to provide an improved cutter in which the cutting surface has a relatively long life.

Another object is the provision of an improved cutting blade that is capable of efficiently cutting tire fabric, which is a cord fabric composed of relatively tough textile cords coated on each side with a thin layer of tacky, unvulcanized rubber stock.

Still another object is to provide an improved anvil structure for supporting a tire fabric or the like while it is being cut.

A further object is the provision of a bias cutting mechanism which can be conveniently and accurately adjusted both with respect to the width of the cut piece, and with respect to the angle of cut.

Still a further object is to provide a conveyor for a bias cutter which accommodates the cutting mechanism at various angles of cut.

It is also an object of the invention to provide for automatic conveying and positioning of the fabric with respect to the cutting mechanism, and automatic actuating of the cutting mechanism when the fabric is in the cutting position.

Still other objects include provision of an improved controlled cutting mechanism including means for making rapid incremental adjustment in the width of the cut pieces of fabric, and provision of improved actuating and guiding means for the cutting mechanism.

The invention provides a cutting mechanism which includes a variable speed conveyor for feeding the material to be cut, having speed control means responsive to the position of the material for reducing the speed of advancement of the material as it approaches the position for the cut. This reduction in the speed of advancement of the material permits the material to be subsequently stopped automatically in the desired position for a cut with great accuracy. For cutting the material, there is provided a blade which has, in place of the conventional sharp cutting edge, a flat working surface, which takes the form of a curved rocker that descends on the material to be cut with a rolling or rocking stroke, crushing and severing the material against an anvil surface provided for this purpose. It has been found that such a flat cutting blade cuts the tire fabric neatly and cleanly and does not need to be sharpened or renewed frequently, as is the case with the various forms of sharp cutting blades conventionally employed, and the improved cutting mechanism does not tend to become fouled with tacky, unvulcanized rubber stock from the tire fabric.

An embodiment of the invention illustrative of the foregoing and other objects and advantages will be described in detail in conjunction with the accompanying drawings, wherein.

Figure 1:
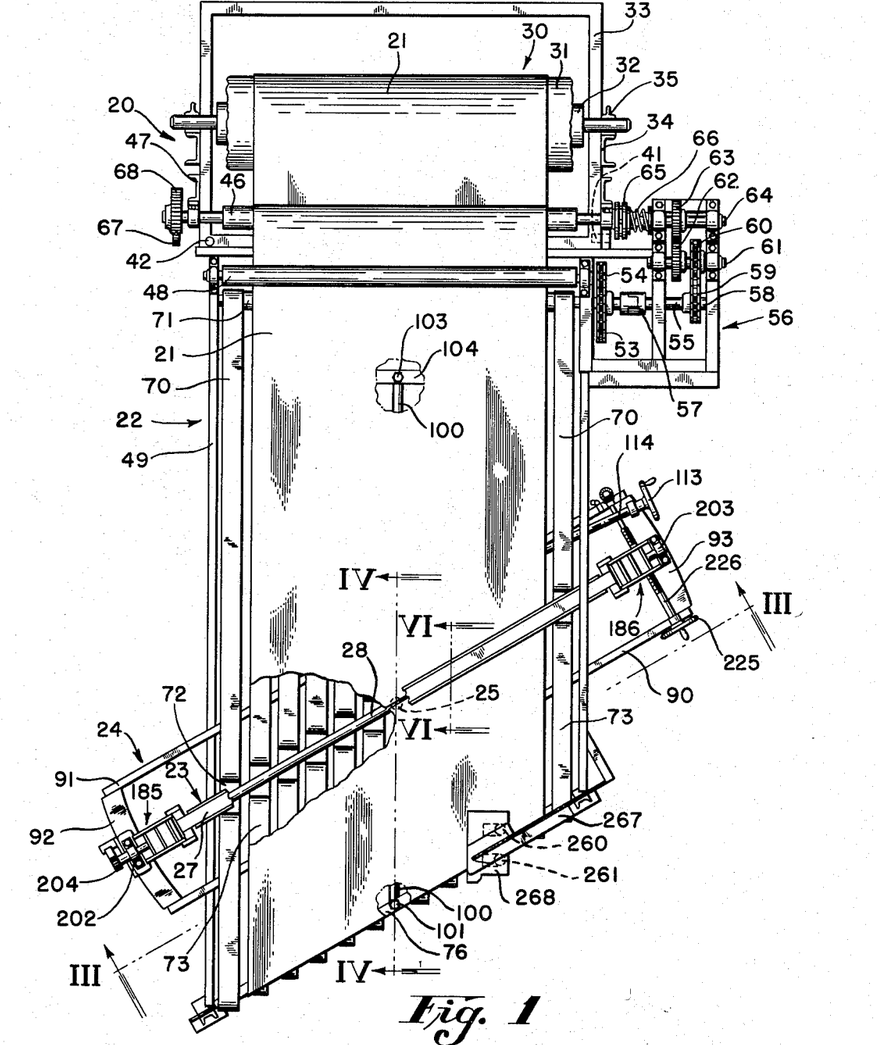
Fig. 1 is a plan view, with parts broken away, of a bias cutting machine constructed according to the invention.
Figure 2:
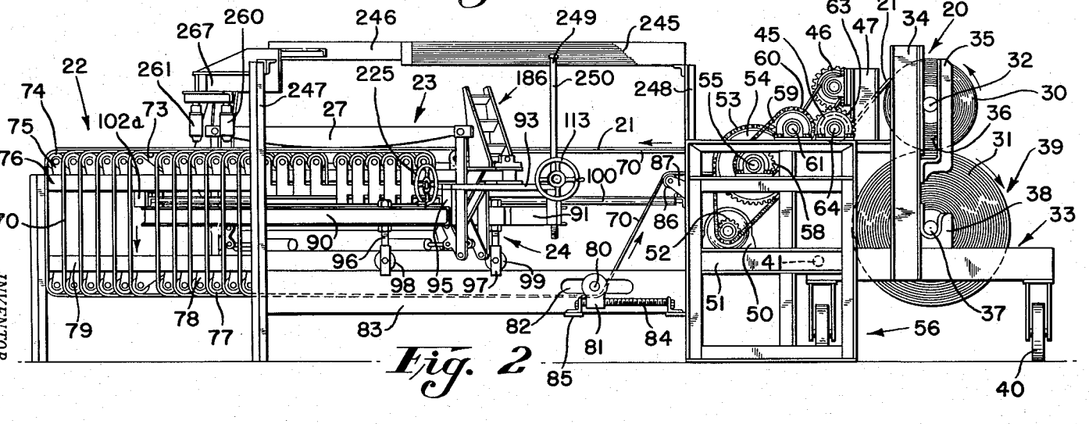
Fig. 2 is a side elevational view of the machine of Fig. 1.

Referring to the drawings, and in particular to Figs. 1 and 2, the machine includes a fabric feeding assembly 20 for introducing the fabric 21 to be cut to a conveying assembly 22, which conveys the fabric longitudinally along the machine in a horizontal plane past an angularly disposed cutting assembly 23 mounted on a cutting assembly carriage support 24. The carriage support assembly 24 is adapted to be translated longitudinally of the machine parallel to the direction of travel of the fabric 21 on the conveyor 22 to vary the width of the cut, and, at the same time the cutting mechanism 23 is mounted on the carriage 24 for angular movement with respect to the carriage, about a pivotal connection 25 (indicated in Figs. 1, 3, 4 and 8) to the carriage, whereby the angle of cut may be varied. The fabric 21 is cut by a cutting blade 26 carried on the underside of a cutting beam 27 that is angularly disposed above the conveying assembly 22 and that is mounted on the cutting assembly 23 to cut the fabric transversely by descending on the fabric with a rolling or rocking movement at intervals in a manner that will be described in detail below. As indicated most clearly in Fig. 6, the fabric, at the point of cut, is supported on a rotary anvil 28 carried in a manner to be described, on the upper surface of an anvil beam 29 extending longitudinally of the cutting assembly carriage 24.

Means for supporting the supply roll of fabric to be cut

Referring particularly to Fig. 2, the fabric 21 to be cut is fed to the machine from a supply roll 30 in which the rubber-coated fabric 21 is wound up with a cloth liner 31 (best seen in Fig. 1) to prevent successive turns of the fabric from sticking together. It will be understood that the fabric 21 and cloth liner 31 are rolled up together in the conventional manner to form the roll 30 as the fabric emerges from the usual calendering machine on which the rubber coating is applied to the fabric. The roll 30 is wound on a roller bar 32 and supported on a carriage 33 having an upstanding member 34 and a bracket 35 defining a vertical slot 36 in which the roller bar 32 is adapted to rotate at a variable height. Initially, the roller bar 32 carrying the roll 30 rests in the bottom of the slot 35 and the periphery of the roll 30 engages another roller bar 37 rotatably supported in a bracket 38 on the lower part of the carriage 33. The roller 37 is adapted to receive the liner 31 as the fabric 21 is drawn off the roll 30 and into the machine. The rotation of the roll 30 in a counterclockwise direction as viewed in Fig. 2 causes the roller 37 to revolve in a clockwise direction, thereby causing the liner 31 to be wound up thereon into a roll 39. As this operation progresses the roll 39 becomes larger and the roller 32 carrying the fabric is gradually raised in the slot 36 as the supply roll 30 becomes smaller, as indicated in Fig. 2.

The entire carriage 33 is mounted on wheels 40 whereby it may be moved conveniently into engagement with, or away from, the feeding mechanism of the machine. At least two such carriages 33 are usually provided, each carrying a supply roll 30, so that as one roll becomes exhausted the carriage and liner roll may be moved away, and a new carriage and supply roll, which have previously been made ready, may be wheeled into place without undue loss of time. The carriage is detachably secured in position in engagement with the machine frame by means of pins 41 and 42 (shown in Fig. 1) inserted through corresponding mating holes located in the respective frameworks of the carriage and of the machine.

Drive means for feeding the fabric

The fabric feeding assembly includes two rollers 45 and 46 (the lower roller 45 appearing in outline in Fig. 2) arranged one above the other and mounted for rotation on uprights 47 secured to the carriage 33. The fabric 21 passes, from the supply roll 30, under lower roller 45 and over upper roller 46, whence it passes downwardly again and under an idler roller 48 (shown in Fig. 1) that is mounted on the upper portion of a framework 49 constituting part of the support for the conveying section 22 of the machine. Motive power for the rollers 45 and 46 is supplied by an electric motor 50 (Fig. 2) supported on a horizontal member 51 within the framework of the machine. For this purpose a sprocket 52 on the shaft of the motor 50 drives, through a chain 53, a sprocket 54 carried by a shaft 55 that is rotatably supported within a laterally extending section 56 of the machine framework. The shaft 55 is coupled to the sprocket 54 through a flexible coupling 57 (Fig. 1). One end of the shaft 55 carries another sprocket 58 which drives a chain 59 connected to an upper sprocket 60 on a shaft 61 mounted for rotation on top of the framework section 56. The shaft 61 carries a gear 62 which meshes with and drives a gear 63 on a parallel shaft 64. The shaft 64 carries at its inner extremity a spring-loaded clutch mechanism 65 (Fig. 1) by which rotation of the shaft 61 is transmitted to the lower roller 45 (shown in outline in Fig. 2) on the carriage 33. The plates of the clutch mechanism 65 may be separated against the action of the compression spring 66 when it is desired to disconnect the driving shaft 64 from the lower roller 45 in order to remove the carriage 33 from the machine. The opposite end of the lower roller 45 is provided with a gear 67 (Fig. 1) which meshes with a corresponding gear 68 on the end of the upper roller 46, thereby driving the upper roller.

Means for conveying the fabric past the cutting assembly

After passing under the idler roller 48, the fabric 21 is deposited on a plurality of parallel endless, flexible conveyor bands 70 which run longitudinally of the conveying section 22 of the machine. The bands pass around a driven roller 71 (Fig. 1) rotatably supported in the upper portion of the framework 49 and coupled to the driving shaft 55, which is, in turn, as indicated previously, driven by the motor 50 through sprocket 52, chain 53, and sprocket 54. The bands 70 pass around the driven roller 71 along the top of the machine in a horizontal plane to the location of the cutting assembly 23. The bands are then passed downwardly and are advanced for a short distance at a lower level, as indicated at 72 in Figs. 1 and 6, by means of a guiding assembly to be described below, for the purpose of accommodating portions of the cutting assembly. The bands thereafter are returned upwardly to their former horizontal plane, as indicated at 73 in Figs. 1, 2 and 6, and at the end of the machine pass downwardly over a series of guide pulleys 74 (Fig. 2) rotatably supported on brackets 75 extending upwardly from an upper transverse member 76 of the machine frame. The bands then pass downwardly to the bottom of the machine and under guide pulleys 77 rotatably supported on brackets 78 attached to a lower transverse member 79 of the machine frame. Thereafter the bands travel back along a horizontal plane at the bottom of the machine to a guide roller 80 rotatably supported on a bracket 81.

In order to provide for adjustment of the tension of the bands, the guide roller 80 is made slidably adjustable longitudinally of the machine in a longitudinal slot 82 in a lower horizontal side frame member 83. For this purpose the bracket 81 is screw threadedly mounted on a rotatable threaded bar 84 passing through the bracket 81 and rotatably mounted in fixed brackets 85 secured to the frame member 83. The bar 84 may be rotated to move the bracket 81 and roller 80 back and forth longitudinally in the slot 82 as desired to vary the tension on the bands. After passing around the roller 80 the bands return upwardly over a further guide roller 86, supported on brackets 87 attached within the machine framework 49, and then back to the driven roller 71.

The driving mechanism for the conveying bands 70 is arranged to move the bands at a slightly greater linear speed than the linear speed at which the fabric 21 is fed onto the conveyor bands from the supply roll 30. This speed differential prevents the fabric from wrinkling on the conveyor and insures that the fabric 21 will be advanced toward the cutting station in a perfectly flat condition for an even, accurate cutting.

Carriage for supporting the cutting assembly

The carriage 24 for supporting the cutting assembly 23 includes two horizontal supporting beams 90 and 91 that are spaced below the conveyor bands 70 and that extend transversely of the machine on a bias. The beams 90 and 91 are secured together at each end by horizontal cross-pieces 92 and 93 disposed above the beams, and each cross-piece is rigidly connected to the beams by pairs of upright members 94 (Fig. 3) and 95.

As stated above, in order to permit adjustment of the width of the cut, the carriage 24 is made adjustable longitudinally with respect to the fabric conveying assembly 22. For this purpose each of the beams 90 and 91 is provided with two downwardly extending brackets 96 and 97 (Fig. 8) on which are supported wheels 98 and 99 (Fig. 2) such wheels being capable of rolling along the upper surfaces of the side horizontal beams 83 constituting part of the lower framework of the machine, whereby the carriage may be rolled back and forth as desired longitudinally of the fabric conveying assembly. Such longitudinal movement of the carriage 24 is effected through the medium of a guide bar 100 (seen in Figs. 1, 2, 3, 4 and 8) which extends longitudinally along the center of the machine. One end of the guide bar 100 is fastened by means of a nut and bolt 101 (Figs. 1, 4 and 8) to an angle bracket 102 (Fig. 4) secured to a downwardly extending piece 102a attached to the underside of the transverse end member 76 of the machine frame. The other end of the guide bar is fastened by a nut and bolt 103 (Figs. 1, 4 and 8) to another crossmember 104 of the machine framework toward the fabric-supply end of the machine.

The guide rod 100 passes slidably through holes in brackets 105 and 106 (Fig. 4) secured to the upper face of the central portion of the carriage beams 90 and 91, respectively. Upper and lower channel members 107 and 108 extend laterally of the carriage parallel to the guide rod 100, and support two spaced vertical plates 109 and 110 between which a gear member 111 is rotatably supported by a suitable collar assembly 111a. The gear member 111 has an axial screw threaded hole therein, through which a correspondingly threaded section 112 of the guide rod 100 extends. Rotation of the gear member 111 produces transverse motion of such gear member along the threaded section 112 of the fixed guide rod 100, as well as transverse motion of the entire carriage 24 which is secured to the gear member 111 through vertical plates 109, 110 and channels 107, 108, and which is also adapted to slide along the guide rod 100 on brackets 105 and 106.

Figure 4:
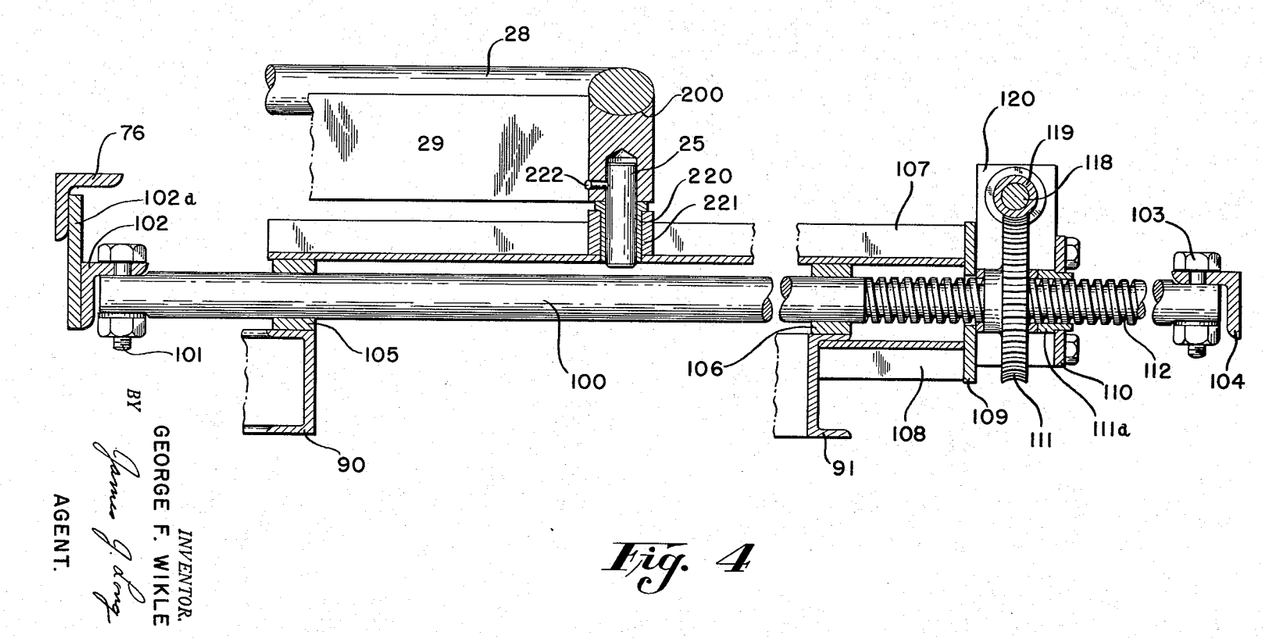
Fig. 4 is a fragmentary view on a larger scale, taken partly in section along line IV—IV of Fig. 1, and with parts broken away.
Figure 5:
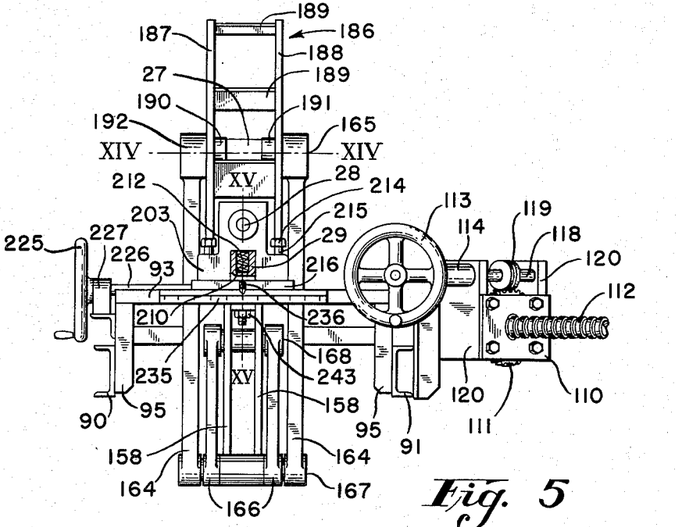
Fig. 5 is an end elevational view of the cutting portion of the machine.
Figures 8, 9, 10:
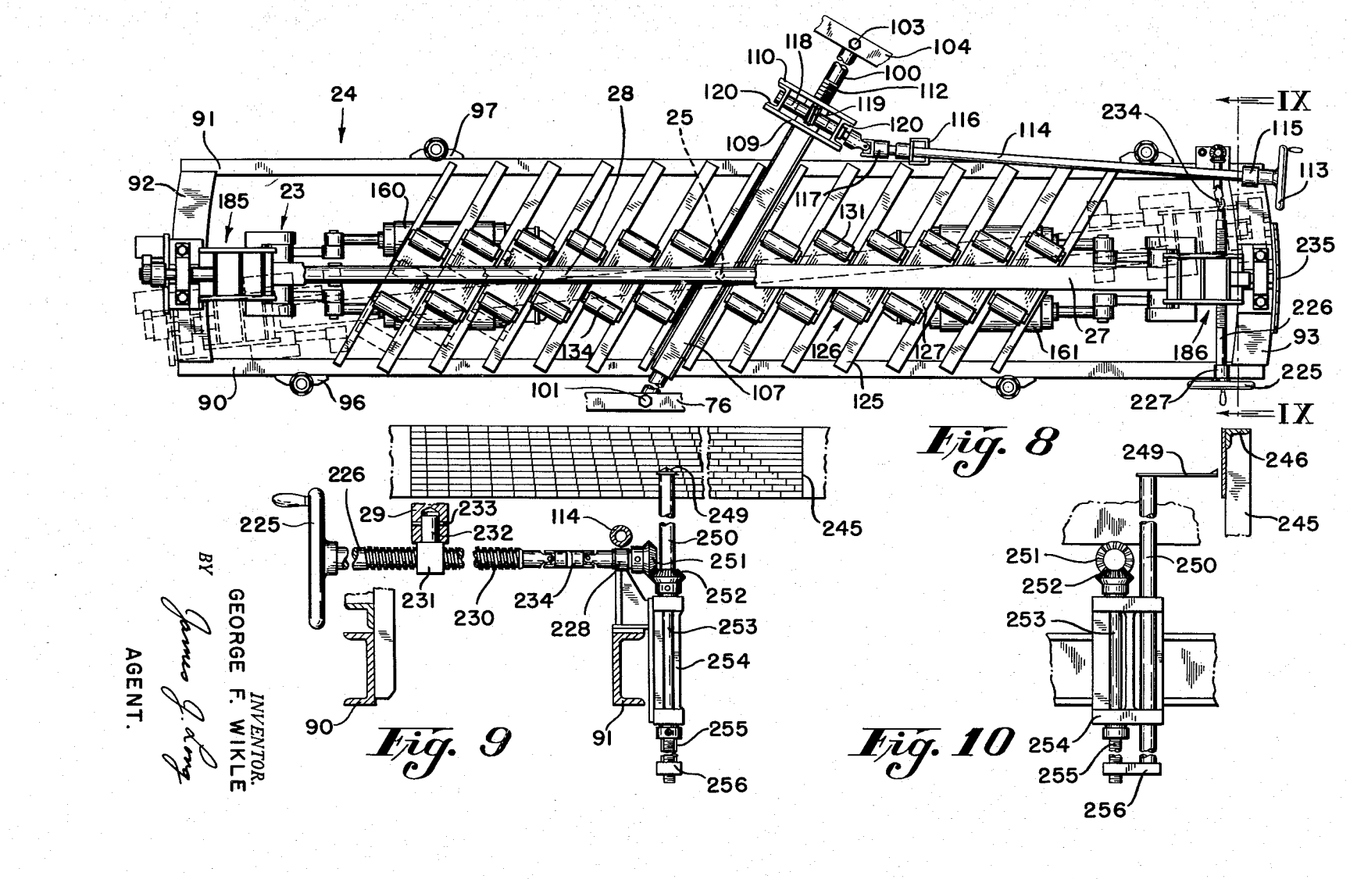
Fig. 8 is a plan view of the cutting mechanism with parts broken away.
Fig. 9 is a fragmentary elevational view, partly in section, showing details of the angle of cut adjusting means and the width of cut indicating means.
Fig. 10 is a fragmentary elevational view showing further details of the width of cut indicating means.

For the purpose of making a desired adjustment in the position of the carriage 24, rotation is imparted to the gear member 111 through a hand wheel 113 (Figs. 1, 2, 5 and 8) located at the side of the machine on one side of the carriage. Such hand wheel serves to rotate a shaft 114 rotatably supported on brackets 115 (Fig. 8) and 116 secured above the framework 91, 93 of the carriage. The shaft 114 extends inwardly toward the center of the carriage and the inner end of the shaft is provided with a universal coupling 117 (Fig. 8) which turns a short angularly extending shaft 118 carrying a worm gear 119 that engages the teeth of the gear member 111 (as shown in Figs. 4, 5 and 8). The shaft 118 is rotatably supported on spacer channel members 120 disposed between the vertical plates 109, 110 that support the gear member 111.

In order to accommodate the cutting mechanism, the carriage 24 is further provided with guiding means for causing the conveying bands to be offset downwardly from their normal horizontal path as indicated previously. For this purpose a series of parallel rails 125 (Figs. 3, 6 and 8), extend at an angle transversely of the carriage from one carriage beam 90 to the other carriage beam 91. The rails 125 are parallel to the longitudinal axis of the machine. The rails 125 support sliding frames 126, each one of which is composed of two side plates 127 (best seen in Figs. 3 and 6) and has two transverse end plates 128. The lower part of each side plate is provided with cleat-shaped legs 129 which slidably engage flanges 130 extending laterally from the tops of the rails 125, as is shown best in Fig. 3. In this way, the frames 126 are adapted to slide back and forth on the rails 125.

The frames 126 are arranged in staggered relation, forming a row disposed on a bias with respect to the longitudinal axis of the machine. One of such frames is provided for each conveyor band 70 and in each frame one of such bands is guided downwardly over a pulley 131 (Figs. 6 and 8) rotatably supported within the upper part of the frame, and thence under a pulley 132 (Fig. 6) rotatably supported within the lower portion of the frame 126. The band 70 then travels in horizontal path within the lower portion of the frame 126 as indicated at 72, to a second lower pulley 133, and then upwardly over an upper pulley 134 whence the band travels out of the frame 126 into its former horizontal plane as at 73. In this manner the band 70 is offset from its horizontal path over a portion of its travel, for the purpose of accommodating portions of the cutting mechanism and permitting the cutting mechanism to engage the fabric 21 to be cut, in a manner now to be described. For the same purpose, the upper portions of the sliding frames 126 are provided with openings 135 (Fig. 6) therethrough.

*The cutting blade and cutting beam*

Figures 6, 6A:
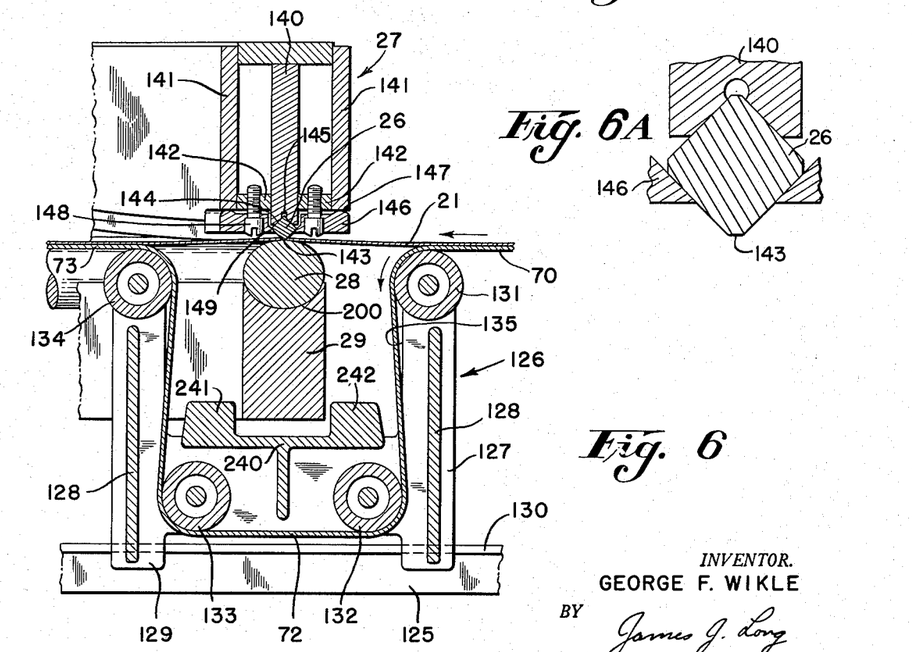
Fig. 6 is an enlarged sectional elevational view of the cutting portion taken along the line VI—VI of Fig. 1.
Fig. 6A is an enlarged sectional view of the cutting blade of the machine.

As indicated previously, the fabric 21 is cut by a cutting blade 26 mounted in the underside of a rocking beam 27 constituting part of the cutting assembly 23 and supported on the cutting assembly carriage 24. Referring particularly to Fig. 6, the beam 27 comprises a central T-member 140, and two vertical side plates 141 secured, as by welding, at their upper portions to the cross-bar of the T-member, and similarly secured at their lower portions to the upright of the T-member through spacer bars 142 disposed therebetween. The underside of the beam 27 is uniformly curved downwardly from each end of the beam as appears most clearly in Fig. 3. The blade 26 is sufficiently flexible to assume a similar curve when incorporated in the beam 27. The blade is generally square in cross-section, and each corner of the square is ground flat to present a relatively narrow flat edge surface 143 (Fig. 6A) that may be, for example, 1/64" wide, and serves to cut the fabric 21 by squeezing and crushing it against the surface of the anvil 28. The blade is removably supported in the bottom of the beam assembly 27, and any one of the four cutting edges 143 may be utilized selectively. For supporting the blade 26, the bottom of the T-member 140 of the beam is provided with an upwardly extending V-shaped recess 144 into which the upper corner of the blade extends. At the apex of the V-shaped recess 144 there is provided an additional upwardly extending recess 145, so that the upper cutting edge of the blade does not actually contact the T-member 140 when the blade is secured in place. The blade is secured in place by means of a plurality of spaced clips 146 insertable in spaced recesses 147 in the underside of each of the side plates 141, and detachably secured to the beam assembly by cap screws 148 passing through suitable holes in the clips 146 into threaded holes in the spacer bars 142. The inner lower marginal edge of each clip is provided with an inwardly extending tapered flange or lip 149 which engages the lower side of the blade 26 and maintains the blade securely in proper position.

*Support and actuating means for the cutting mechanism*

Figure 3:
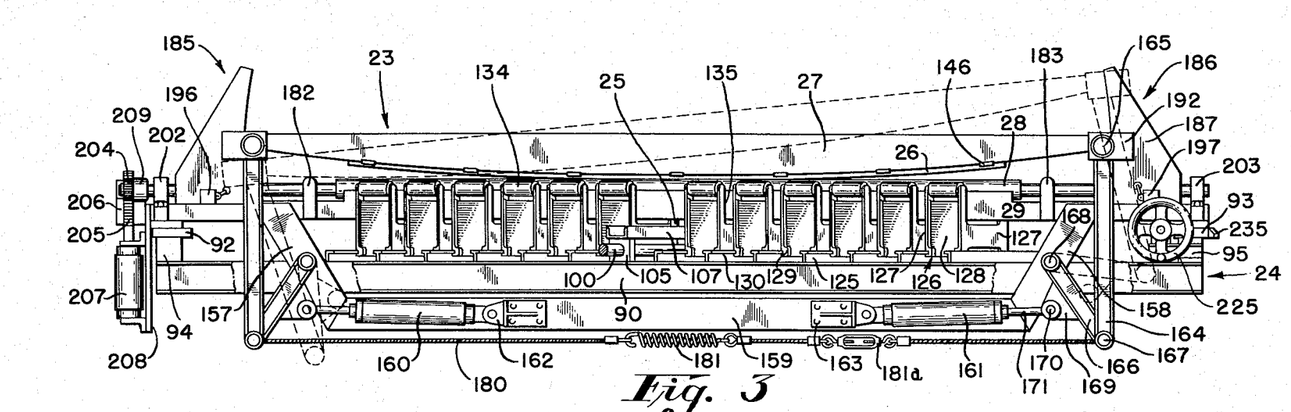
Fig. 3 is a front elevational view on a larger scale of the cutting portion of the machine taken along line III—III of Fig. 1, with parts broken away.

The support for the cutting beam 27 comprises a framework including the anvil beam 29, best seen in Fig. 3, that extends the length of the carriage 24. The anvil beam 29 is slidably supported on the upper surface of the end plates 92 and 93 of the carriage 24. The anvil beam is disposed under the cutting beam 27, and extends freely through the central openings 135 in the sliding frames 126 previously described. Spaced from each end of the anvil beam 29, and secured to the sides thereof, there are downwardly extending frame members 157 and 158, which pass downwardly between the carriage beams 90 and 91 and which support a lower transverse beam 159. The beam 159 carries, near each of its ends, pneumatic double-acting actuating cylinders 160 and 161 pivotally secured at their inner ends to the sides of the lower beam 159 on brackets 162 and 163 respectively.

For the purpose of actuating the cutting beam 27, each of the pneumatic cylinders 160, 161 is pivotally linked to one end of the cutting beam. Such pivotal linkage includes, at the right hand side of the machine as viewed in Fig. 3, a downwardly extending lever or arm 164 pivotally joined at its upper end by a pivot pin 165 to one end of the beam 27, and also includes an upwardly extending arm 166 pivotally joined at its lower end to the bottom end of the arm 164 by a pivot pin 167, and pivotally joined at the upper end to the frame member 158 by a fixed pivot pin 168. A bracket 169 on the arm 166 carries a pivotal connection 170 to which the piston rod 171 of the cylinder 161 is joined. In a similar manner the opposite end of the cutting beam 27 is pivotally joined by an identical arrangement of pivotally linked levers to the actuating cylinder 160.

The pivotal actuating linkages at each end of the machine are joined together by a cable arrangement 180 attached on one side of the machine to the lower end of the lever 166 and to the corresponding lever at the opposite end of the machine, and having a tension spring 181 at its center. The tension exerted on the actuating linkages may be varied by adjustment of a turnbuckle 181a in the cable 180.

The arrangement of pivotal linkages and two actuating cylinders is duplicated on each side of the cutting assembly, so that there are a total of four double-action actuating cylinders as shown in Fig. 8, all of which act simultaneously during each stroke of the cutting beam 27. The various pivot pins, such as pivot pins 165, 167 and 168 joining the various levers or arms of the actuating linkages pass through to the corresponding arms at the opposite side of the assembly, as wil be appreciated from inspection of Fig. 5.

The dotted lines in Fig. 3 indicate the rocking movement of the cutting beam 27 and the movement of the pivotally linked actuating levers, as actuated by the pneumatic cylinders 160, 161. The cutting beam is shown in solid lines at the half-way position in the act of making the cut; the dotted lines show the beam at the completion of a cutting stroke toward the left-hand side of the machine, and ready to start a second cutting stroke toward the right-hand side of the machine. The leverage due to the pivotal linkage arrangement and the tension in the spring and cable arrangement is such that substantially uniform pressure is exerted by the cutting arm throughout the length of its stroke. The spring and turnbuckle arrangement in the tensioning cable 180 permits the cutting force to be controlled independently of the force exerted by the actuating cylinders.

The upper surface of an upwardly projecting pin or stop 182 (Fig. 3) secured to the anvil beam 29 serves as a pivot point for the cutting beam 27 towards the end of its stroke on the left end of the machine as viewed in Fig. 3. The upper surface of the pin 182 is in a slightly higher horizontal plane than the upper surface of the rotary cutting anvil 28. The lower surface of the beam 27 engages the pin 182 towards the ends of its stroke, and by pivoting on the upper surface of the pin 182, the cutting blade is lifted from the anvil 28, thus permitting a new length of fabric 21 to pass into cutting position on the anvil below the blade 26. The cutting beam is also thereby prevented from interferring with rotation of the anvil, which takes place subsequent to the cutting stroke in a manner that will be described below. A similar pin or stop 183 is provided at the other side of the machine, to lift the blade from the anvil at the end of a cutting stroke made downwardly at the right-hand side of the machine. As the cutting beam engages the stops 182 or 183 toward the end of a cutting stroke, the mechanical advantage exerted on the low end of the cutting beam by the downwardly moving actuating linkages thereto will be small, while upwardly moving actuating linkages will act with a readily greater mechanical advantage, thereby easily lifting the beam free of the anvil for passage of the fabric.

Figures 11, 12, 13, 14, 15:
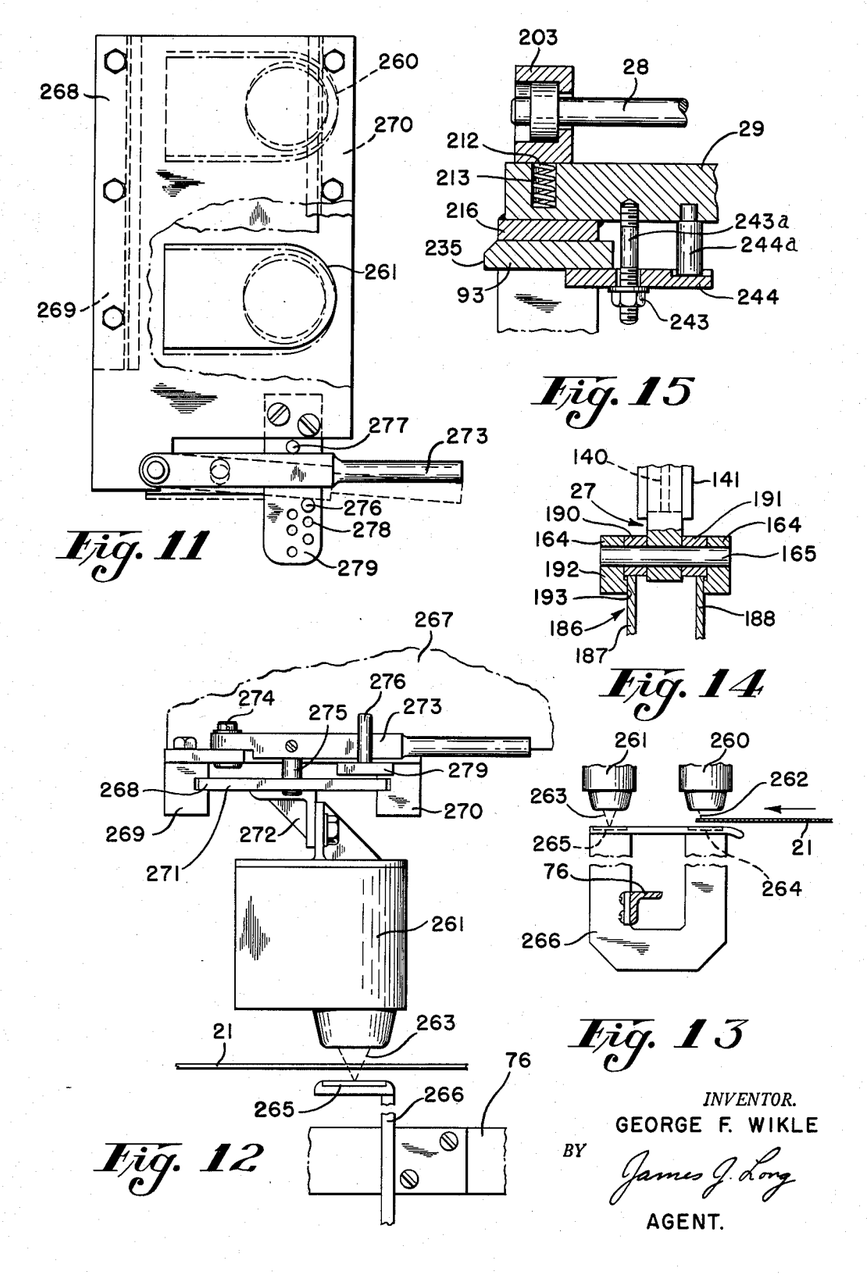
Fig. 11 is a fragmentary plan view on a larger scale of photo-electric control assembly units, with parts broken away.
Fig. 12 is a fragmentary elevational view of the photo-electric assembly shown in Fig. 11.
Fig. 13 is a fragmentary elevational view of certain parts of the photo-electric assembly shown in Fig. 12.
Fig. 14 is a fragmentary detailed plan view taken partly in section along the line XIV—XIV of Fig. 5.
Fig. 15 is a fragmentary detailed elevational view taken in section along the line XV—XV of Fig. 5.

The cutting arm 27 is guided in its rocking movement by upwardly extending guide structures 185 and 186, located at each end of the cutting assembly. Each guide structure is composed of two upright parallel side plates 187 and 188 (Figs. 5 and 14) attached at their bases to the anvil beam 29 and connected together by transverse reinforcing members 189. The inner edge faces of the guide plates 187, 188 are arcuate to correspond to the curved path described by the ends of the cutting beam 27 during the cutting stroke, and such edges are engaged by free-running rollers 190, 191 disposed between the cutting beam and the end of the actuating arms 164 and carried by the pivot pin 165 which connects the actuating arms 164 to the cutting beam 27. To provide lateral stability for the cutting beam the end of each arm 164 is provided with an extension section 192, the inner face 193 of which makes sliding contact with the lateral face of the upright plate 187.

The actuation of the pneumatic cylinders 160, 161 may be controlled manually through suitable manually operated valves (not shown), but in the interest of economy, speed and accuracy it is preferred to arrange for the cutting operation to take place automatically. To this end, the pneumatic cylinders 160, 161 are preferably actuated by a solenoid-operated control valve 195 (Fig. 7), the action of which will be explained in detail below in connection with the description of the automatic controlling system shown in Fig. 7.

Included in the electrical controlling system for the valve 195 are two limit switches 196 and 197 (Figs. 3 and 7) located at the base of each of the guide structures 185 and 186 and adapted to be engaged by the respective ends of the cutting beam toward the end of a cutting stroke. The limit switches establish electrical circuits through the solenoid valve 195 in a manner that will be described below. The control valve 195 has two positions in one of which the cylinders are actuated in one direction and in the other of which the cylinders are actuated in the opposite direction.

*Cutting anvil and actuating means therefor*

The upper surface of the anvil beam is raised over the central portion of the beam, and is provided with a semicircular recess 200 (Figs. 4 and 6) in which there is nested the rotary anvil 28 (Figs. 1, 3, 4 and 6) that is circular in cross-section. As indicated previously the fabric 21 is cut between the flat edge 143 of the blade 26 and the surface of the anvil 28 as the cutting beam 27 descends against the anvil. There is some tendency for the rubber covered fabric 21 to stick to the anvil 28 as the cut is made, and for the purpose of freeing the fabric from the anvil, so that it may pass freely over the anvil in the desired manner for the next cut, means are provided for rotating the anvil. For this purpose the ends of the anvil shaft are rotatably mounted in bearing supports 202 and 203 (Figs. 1, 3, 5 and 8) located at opposite ends of the anvil beam 29. The anvil is rotated by means of a pinion gear 204 (best seen in Fig. 3) carried on one end of the anvil shaft, which engages a vertically extending toothed rack 205 that is slidably mounted in a bracket 206 attached to the end of the beam 29. The rack 205 is actuated by a double-acting pneumatic cylinder 207, also supported by a suitable bracket assembly 208 on the end of the beam 29. The pinion gear 204 is mounted on the end of the anvil shaft by means of a conventional one-way slipping clutch arrangement 209, so that the anvil rotates in the direction of travel of the fabric on the upward stroke of the rack 205, but does not rotate on the downward stroke, since the clutch 209 permits the pinion gear 204 to slip with respect to the anvil. The pneumatic cylinder 207 which rotates the anvil may be controlled manually by suitable manually operated control valve (not shown), but it is preferable that this operation be controlled automatically for greater efficiency, as will be described below.

For the purpose of relieving friction between the anvil 28 and the anvil beam recess 200 in which the anvil rests during rotation of the anvil, means are provided for raising the anvil slightly when the cutting blade 26 is moved out of engagement with the anvil after a cutting operation. For this purpose the bearing supports 202 and 203 which support the anvil are slidably disposed over the beam 29, as is indicated most clearly in Fig. 5, and each of such bearing supports has a recess 210 extending upwardly from its lower surface for accommodating the beam 29. A compression spring 212 is disposed in a recess 213 (Fig. 15) extending downwardly into the beam 29 where is passes through the bearing support 203. The spring 212 bears upwardly against the bearing support 203 and raises the anvil 28 when the cutting blade 26 is moved out of engagement with the anvil after a cutting operation.

The extent of the upward movement of the bearing support and anvil is limited by adjustable stop nuts 214 (Fig. 5) on the threaded ends of studs 215, that extend upwardly from a plate 216 attached to the lower surface of the beam. The studs pass slidably through suitable holes in the lower portion of the bearing support. Similar compression spring arrangements are provided within each of the bearing supports 202 and 203.

Adjustment of the cutting angle

For the purpose of adjusting the cutting angle, the entire cutting assembly 23 may be caused to pivot by means of a vertical pivot pin 25 that passes downwardly from the center of the beam 29 into a bushing 220 (Fig. 4) contained in a sleeve 221 mounted on top of the channel beam 107 comprising part of the framework of the carriage 24. A shear pin 222 passes through the side of the beam 29 and into the pivot pin 25 to maintain it in place. The desired angular adjustment of the cutting assembly 23 by means of the pivot pin 25 is effected through the medium of a hand wheel 225 (Fig. 5) on a shaft 226 rotatably supported in bearings 227 and 228 (Fig. 9) mounted above one end of the beams 90 and 91 of the carriage assembly 24. As is indicated in Fig. 9 the shaft 226 is threaded over its central portion 230, and a correspondingly threaded collar 231 on this center portion carries an upwardly extending connecting pin 232 that extends into a corresponding hole in the bottom of the anvil beam 29. A shear pin 233 passes into the beam 29 and through the pin 232 maintaining these two members in operable relation. A linkage 234 having a universal joint on each end connects the shaft to the bearing support 228. Rotation of the hand wheel 225 causes the collar 231 to travel along the threaded portion 230 of the shaft 226 thereby moving the beam 29, and the entire cutting assembly 23, including the cutting beam 27 and the framework 157, 158 and 159 (Fig. 3) carrying the cut-actuating mechanism, about the pivot pin 25, so that the angle of the cutting assembly 23 is changed with respect to the cutting assembly carriage 24 on which it is mounted. The angle of cut is indicated on a degree scale 235, carried on the edge of the end plate 93, by a pointer 236 (Fig. 5) mounted on the plate 216, which is secured to the beam 29, and which slides on the upper surface of the end plate 93 as the angle is changed.

The sliding frames 126 are arranged to follow the anvil beam 29 as the angle of cut is changed, by sliding along the rails 125 provided for this purpose. To cause the frames 126 to change position with the cutting mechanism, each frame has a transverse member 240, shown in Fig. 6, that is provided on each end of its upper surface with projections 241 and 242, between which the lower part of the anvil beam 29 passes freely. As the anvil beam 29 is moved angularly with the cutting assembly in one direction or the other about the pivot pin 25, the lower edges of the anvil beam engage one or the other of the projections 241, 242, thereby urging the frame 126 in the appropriate direction. The dotted lines in Fig. 8 indicate the change in position of the sliding frames 126 as the angle of the cutting mechanism is changed. In this way the horizontally depressed sections 72 of the conveyor bands 70 are made to change position to accommodate the cutting mechanism as the angle thereof is changed.

The cutting assembly may be securely clamped at the desired angular position with respect to the cutting assembly carriage by tightening a clamping nut 243 (Fig. 15) on the threaded end of a bolt 243a that is rigidly secured to the underside of the anvil beam 29 and that passes freely through a hole in a clamping plate 244 that is supported below the anvil beam in spaced relation thereto by a pin 244a. The upper face of the end of the clamping plate 244 slides against the bottom face of the end plate 93, and may be made to bear firmly against the end plate by tightening the clamping nut 243.

Width-of-cut scales

As the angle of the cutting assembly 23 is changed, the position of the cutting assembly carriage 24 with respect to the conveyor assembly 22, required for a desired width of cut will, in general, be different. Therefore, for every angle of cut, there will be need for reference to a different width scale in making adjustment for the desired width of cut. To supply this need, there is mounted above the conveying assembly on one side thereof, a multiple width-of-cut scale 245 (Figs. 2 and 9), having a plurality of differently calibrated horizontal width-of-cut scales arranged one above the other, each of such horizontal scales corresponding to a different angle of cut. The multiple scale 245 is supported on a horizontal beam 246 (Fig. 2) parallel to the longitudinal axis of the conveyor, and carried by upright members 247 and 248 fixed to the framework of the conveyor. A pointer 249 on the top of a vertical rod 250 is arranged to index to the proper width-of-cut scale as the cutting angle is changed by rotating the hand wheel 225. For this purpose the end of the shaft 226 (Fig. 9), which changes the cutting angle, has mounted thereon a bevel gear 251 that engages a bevel gear 252 on the top of a vertical shaft 253, mounted for rotation parallel to the pointer rod 250 in a suitable vertical bracket 254 rigidly attached to the carriage assembly 24 at the side of the carriage beam 91. The lower portion 255 of the shaft 253 is threaded through a correspondingly threaded collar 256, to one end of which the bottom of the pointer rod 250 is secured as indicated in Fig. 10. The pointer rod 250 passes upwardly through the bracket 254 in sliding engagement therewith through suitable holes in the bracket. As the vertical shaft 253 is rotated, through rotation of the angle-changing shaft 226 and bevel gears 251 and 252, the threaded collar 256 will be caused to move upwardly or downwardly on the threaded portion 255 of the shaft 253, thereby raising or lowering the sliding pointer rod 250. Thus, as the angle of cut is changed from, say, 55° to 65° on the degree scale 235, the pointer 249 on the multiple width of cut scale 245 will be raised progressively from the lower horizontal width-of-cut scale, which may be calibrated to read the proper width of cut at 55°, to the upper width-of-cut scale, which may be calibrated to read the proper width-of-cut at 65°. Intermediate scales on the width-of-cut scale may correspond to intermediate angles between 55° and 65°. Therefore, as the carriage 24 carrying the cutting assembly 23 is moved back and forth on the rollers 96 and 97 by turning the hand wheel 113 to change the width of cut as described previously, the pointer 249 automatically indicates the width of the cut on the appropriate scale.

Photoelectric control

Automatic operation of the machine is controlled principally by means of two photoelectric switch assemblies 260 and 261 mounted above the terminal sections 73 of the conveyor bands in such position that beams of light 262 and 263 (Figs. 7 and 13) are directed downwardly across the path of the fabric 21 after the fabric has moved past the cutting assembly. Horizontal mirrors 264 and 265 disposed below each of the photo switches are mounted on a U-shaped bracket 266 (Figs. 12 and 13) secured to the transverse end frame member 76 of the machine, and are adapted to reflect the light beams back into the photo switches when no fabric is in position therebetween. The photo switches are supported from a transverse overhead frame member 267 (Figs. 1, 2 and 12) to which is attached a horizontal plate 268 (Figs. 11 and 12) having bolted on its underside longitudinally extending slide members 269, 270 along each lateral margin. A supporting plate 271, which is adapted to slide in the slide members 269, 270, has on its underside a downwardly extending bracket 272 to which the photo switches 260, 261 are secured.

Figure 7:
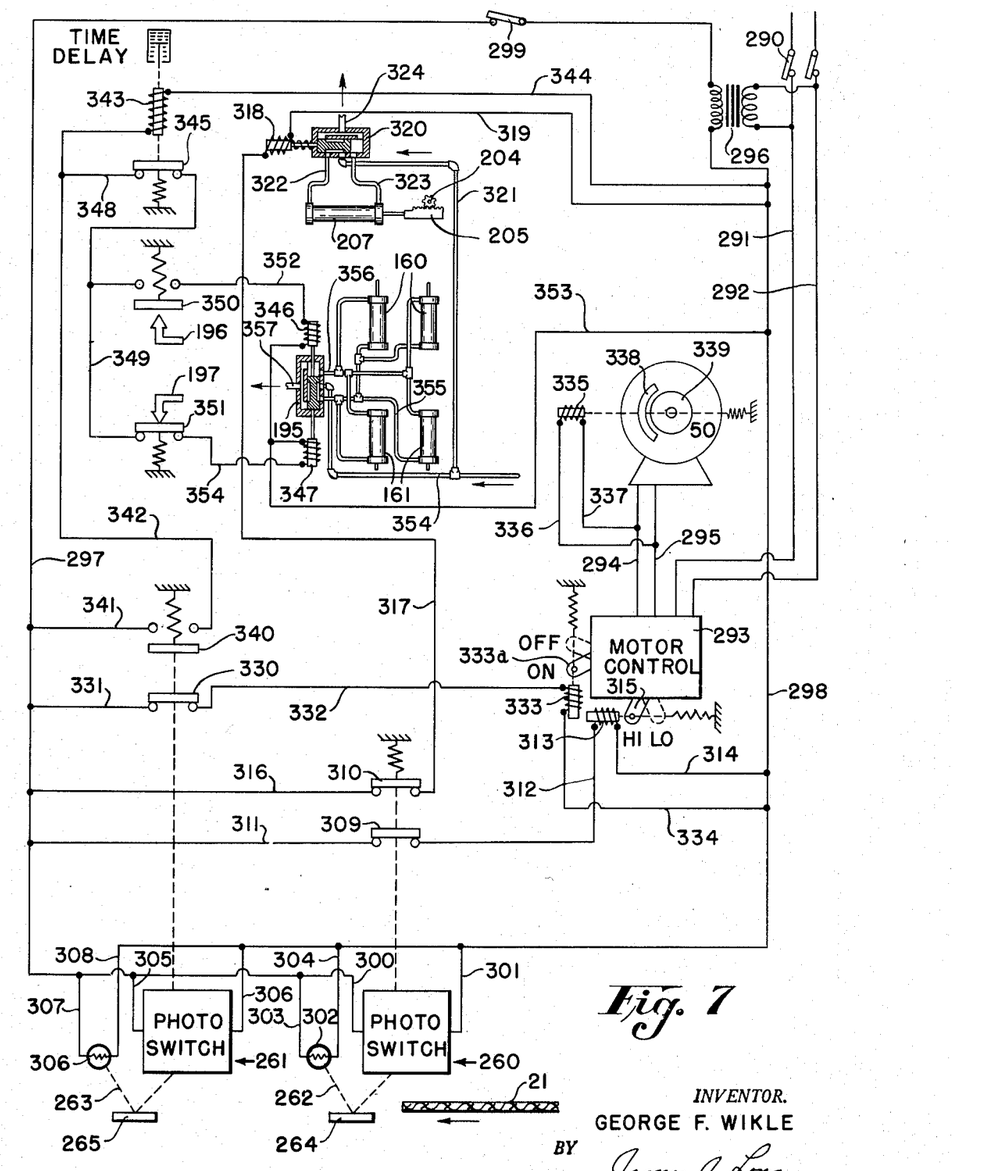
Fig. 7 is an elementary electrical diagram of the controlling system for the machine.

The arrangement is such that as the fabric 21 moves into position under the first photo switch 260, the controlling system shown in Fig. 7 causes the driving motor 50 to be slowed down, and then the fabric moves at a slow rate of speed into the path of the second photo switch 261, whereupon the driving motor stops and the cut is made. The width of the cut piece of fabric will therefore be determined by the horizontal distance between the second photo switch 261 and the cutting assembly. As indicated previously, such distance is adjusted as desired by turning the hand wheel 225 and reading the width on the appropriate scale of the multiple width-of-cut scale 245. In conventional tire building practice it is common to have the successive plies of a multiple-ply tire of given size vary in width by definite amounts to provide for a certain desirable overlapping arrangement of the plies around the beads of the tire. Therefore it is desirable to be able to vary quickly the width of successive cuts of fabric by definite increments. For this purpose, means are provided by which the operator may quickly change the position of the photo switch by definite increments, without disturbing the basic width of cut adjustment as determined by the setting of the hand wheel 225. For this purpose an adjusting handle 273 (Figs. 11 and 12) is pivotally joined at one end to the upper fixed support plate 268 by a fixed pivot pin 274, while a second pivot pin 275 passes downwardly from an intermediate portion of the handle to the sliding plate 271. The arrangement is such that as the handle 273 is swung about the pivot pin 274, the sliding plate 271 carrying the photo switches slides back and forth in the slides 269, 270. The handle 273 may be fixed at a desired position by insertable stop pins 276 and 277 that can be placed selectively in any of a number of spaced holes 278 in a plate 279 fixed to the plate 268, each such hole representing a definite increment, say ¼", of variation in the width of cut. Thus, for example, when the operator has cut a sufficient supply of fabric of width corresponding to that obtained when the handle 273 is positioned against the stop 277 as indicated by the full lines in Fig. 11, a simple movement of the handle to a position in which it bears against the stop 276, as indicated by the dotted lines, permits a supply of fabric of x inches greater width to be cut automatically.

The controlling system will now be described in conjunction with the elementary electrical diagram, Fig. 7. The lower part of the diagram represents the photo switch arrangement. To the right and above, the driving motor and its control are shown, while to the upper left, the mechanism for actuating the cutting arm and the control for rotation of the cutting anvil are represented. At the top right, the power supply lines will be seen.

Power is supplied through a main switch 290 through conductors 291, 292 to a motor control device 293, which in turn feeds power to the driving motor 50 through conductors 294 and 295. The motor controller 293 may be of conventional construction and is capable of turning the motor on and off, and of running the motor either at high speed or low speed, as will be described.

A transformer 296 connected across the power conductors 291, 292 feeds current at a reduced voltage to the main conductors 297 and 298 of the controlling system. A switch 299 is provided in the line 297 for turning the control system on and off.

The first photo switch unit 260 is connected across the conductors 297 and 298 by conductors 300 and 301, and a light source 302, which directs the light beam 262 onto the mirror 264 and into the photo switch 260 is similarly connected across the supply conductors 297 and 298 by means of conductors 303 and 304. In like manner the second photo switch unit 261 is connected across the conductors 297 and 298 by conductors 305 and 306, while a light source 306 for this unit is similarly connected by conductors 307 and 308.

The first photo switch 260 actuates motor speed control contacts 309 and anvil control contacts 310 which are normally closed when the photo switch is energized by the light beam 262, and which open when the fabric moves into position to interrupt the light beam. A conductor 311 leading from conductor 297 to the motor speed control contacts 309 feeds current to a conductor 312 that is connected to a speed control solenoid 313, whence the current returns to the conductor 298 through a conductor 314. The solenoid 313, when energized, maintains a switch arm 315 of the motor control 293 in the high speed position, such arm normally being maintained in the low speed position when the solenoid 313 is de-energized.

An anvil control circuit is also provided from conductor 297 through a conductor 316, anvil control contacts 310 of the first photo switch 260, and conductor 317, to an anvil control valve solenoid 318, and thence through a conductor 319 to the conductor 298. When the solenoid 318 is energized an anvil control valve 320 is moved into position to apply pneumatic pressure supplied through pneumatic line 321, to line 322 leading to the anvil rotating cylinder 207, which rotates the anvil through the rack 205 and pinion 204. In this position line 323 leading from the cylinders 207 serves as an exhaust line leading to the exit port 324 of the valve 320. When the solenoid 318 is de-energized the valve 320 is spring returned to its alternate position such that the line 322 becomes the exhaust and pressure is applied to the cylinder 207 through line 323.

The second photo switch 261 actuates motor control contacts 330, which are maintained in the closed position when the photo switch 261 is energized by the light beam 263 from the source 306, and a circuit is provided from the conductor 297 through a conductor 331, contacts 330, and a conductor 332, into a motor control solenoid 333, and thence back by means of a conductor 334 to the conductor 298. When the motor control solenoid 333 is energized an "on-off" switch 333a of the motor controller 293, that is normally maintained in the "off" position, is moved to the "on" position. In this way, the motor 50 will run when the light beam 263 is striking the second photo switch 261, and the motor will stop when such light beam is interrupted by the fabric 21.

For the purpose of bringing the fabric feeding and conveying mechanism to a stop quickly there is provided a brake control solenoid 335, that is connected across the motor conductors 294, 295 by conductors 337 and 336. The arrangement is such that the brake solenoid 335 is energized when current is being supplied to the motor, and such solenoid draws a spring-returned brake shoe 338 out of contact with a brake drum 339 on the motor 50. When the current to the motor is interrupted the solenoid 335 is de-energized and the spring-returned brake shoe 338 engages the brake drum 339, bringing the driving mechanism to a stop quickly.

The second photo switch 261 is also provided with cutting-control contacts 340 which are open when this photo switch is energized by the beam of light 263, and closed when the beam is interrupted. A cutting control circuit is provided from the conductor 297 through conductor 341, contacts 340, conductor 342, and thence through a time delay relay 343, and conductor 344 back to the conductor 298. The time delay relay has normally closed contacts 345 by means of which a cut-actuating circuit is established through one or the other of the two limit switches 196 or 197, thereby energizing one or the other of two solenoids 346 or 347 which position the cut-actuating valve 195 in either one of its two operating positions. Shortly after the time delay relay 343 is energized by closure of the second photo switch cutting control contacts 340, the contacts 345 of the time delay relay open, thereby opening the circuit through the limit switches 196 and 197 and preventing repetition of the cutting stroke. A conductor 348 connects the conductor 342 to the time delay contacts 345, and a conductor 349 leads to contacts 350 of the limit switch 196 as well as to contacts 351 of the limit switch 197. The limit switch contacts 350 are connected by a conductor 352 to one side of one valve solenoid 346, while the other side of the solenoid 346 is connected to the conductor 298 by a conductor 353. Similarly, a conductor 354 leads from contacts 351 of the limit switch 197 to one side of the remaining solenoid 347, the other side of this solenoid being connected to the return conductor 353. The respective limit switch contacts are closed when either end of the cutting beam 27 is in contact therewith, and these contacts open as soon as the cutting beam moves away from the switches.

The valve 195 is connected to a source of pneumatic pressure through line 354, and in the position shown, in which the solenoid 347 has been energized, the valve supplies such pneumatic pressure to one side of the actuating cylinders 160, 161 through the lines 355, while the lines 356 lead from the cylinders to an exhaust port 357 of the valve. When the remaining solenoid 346 is energized in place of the solenoid 347, the valve takes up its alternate position such that lines 355 become the exhaust lines and pressure is applied to the cylinders through the lines 356 to actuate the cylinders in the opposite direction. The valve 195 remains in the position last energized.

*Summary of method of operation*

In operation, the fabric 21 is fed from the feeding assembly 20 by the action of the motor 50 onto the conveyor assembly 22, which is also driven by the motor 50 by the driving mechanism described above, and which carries the fabric under the cutting beam 27. In the elementary electrical diagram, Fig. 7, the control system is represented in the condition which obtains at the end of a stroke of the cutting beam 27, after the cut piece of fabric has been removed and a new length of fabric is approaching the photo switches. As the fabric 21 interrupts the light beam 262 of the first photo switch unit 260 the motor speed control contacts 309 open, de-energizing the speed control relay 313 and permitting the speed control switch arm 315 of the motor control 293 to move to the low speed position, as indicated by the dotted lines. The driving motor 50 is thereby slowed down, thus advancing the fabric 21 at a reduced rate of speed into the path of the light beam 236 of the second photo switch unit 261. The fabric is then stopped in the desired position for the cut by opening of the motor control contacts 330 of the photo switch unit 261, thereby de-energizing the motor control relay 333, permitting the switch arm 333a of the controller 293 to move to the "off" position. This interrupts the current to the motor 50 through the conductors 294 and 295 and de-energizes the brake solenoid 335 permitting the spring actuated brake shoe 338 to contact the brake drum 339, thereby bringing the motor to a substantially instantaneous stop, causing the fabric to be brought to rest in the exact position for the desired width of cut.

The second photo switch unit 261 also closes the contacts 340 of the cut-actuating circuit, energizing the time delay relay 343 and also energizing one solenoid 347 of the cut-actuating valve 195 through closed contacts 345 of the time delay relay and closed contacts 351 of the limit switch 197. The contacts of the limit switch 197 are in the closed position because the end of the cutting beam 27 has been resting in contact with such switch since completion of the previous cutting stroke. Energizing of the solenoid 347 causes the valve 195 to apply pneumatic pressure to the actuating cylinders 160, 161 through the lines 355, causing the cutting beam 27 to descend on the stationary fabric with a rocking motion through the pivotally linked lever arrangements described above. The flat edge 143 of the cutting blade 26 on the underside of the cutting beam 27 crushes the fabric 21 against the upper surface of the anvil 28, making a clean, accurate cut in the fabric. As the cutting beam leaves the limit switch 197, the contacts 351 of this switch open, breaking the circuit through the solenoid 347, but the valve 195 is not affected thereby since it remains in the position last energized. Shortly after the initiation of the cutting stroke the time delay relay 343 opens the contacts 345. When the cutting beam 27 reaches the end of its stroke, it engages the other limit switch 196, thereby closing the contacts 350, but the remaining solenoid 346 of the valve 195 is not energized because the contacts 345 of the time delay relay 343 have meanwhile been opened, breaking the circuit.

At the completion of the cut the operator removes the cut piece of fabric from the machine. As the cut piece is removed, the light beam 262 again strikes the first photo switch unit 260 and the light beam 263 similarly strikes the second photo switch unit 261. The photo switch 261 causes the motor control contacts 330 to close, energizing the motor control relay 333 so that the switch arm 333a of the control 293 is moved to the "on" position, supplying current to the motor 50. Such current also energizes the brake solenoid 335, drawing the brake shoe 338 away from the brake drum 339. Similarly, the motor speed control contacts 309 are closed by the first photo switch unit 260, energizing the speed control solenoid 313 and moving the speed control switch arm 315 to the high speed position. The motor 50 therefor begins to move the fabric 21 forward once again at high speed when the cut piece of fabric is removed. At the same time, the first photo switch 260 closes the anvil control contacts 310, energizing the solenoid 318 of the anvil control valve 320, and applying pneumatic pressure to the anvil cylinder 270 through the pneumatic line 322, causing the anvil 28 to rotate through the rack and pinion arrangement 205, 204. The rotation of the anvil 28 frees the cut end of the fabric 21 from the surface of the anvil, to which the fabric has some tendency to stick. Also, such rotation aids in carrying the fabric forwardly across the cutting assembly onto the end sections 73 of the conveyor bands 70.

The energizing of the second photo switch unit 261 upon removal of the fabric also opens the contacts 340 in the cut-actuating circuit. This de-energizes the time delay relay 343 so that the contacts 345 close, setting the circuit for the next successive cutting stroke.

As a new length of fabric moves at high speed into position again under the first photoswitch unit 260, the motor control is again moved to the low speed position as previously described. Also, opening of the contacts 310 in the anvil control circuit de-energizes the relay 318 permitting the spring returned valve 320 to return to its initial position. This causes a reverse movement of the cylinder 207 and the rack and pinion arrangement 205, 204, but no reverse rotation of the anvil 28 is produced because the pinion 204 is connected to the anvil by the one-way slipping clutch 209 (Fig. 3).

As the fabric continues at low speed into the path of the second light beam 263, the motor 50 is again stopped as previously described and the cut-actuating circuit is again energized. The contacts 351 of the limit switch 197 will now be in the open position while the contacts 350 of the limit switch 196 will be in the closed position. Therefore, the solenoid 346 will be energized, moving the valve 195 to its alternate position, so that the cylinders 160, 161 are supplied with pneumatic pressure through the lines 356, actuating the cutting beam 27 in a direction opposite to the direction of the previous stroke. At the end of the stroke, the cycle of operation of the controlling system is completed, with the limit switch 197 in the closed position and the limit switch 196 in the open position as represented in Fig. 7.

From the foregoing, it is evident that the invention provides an efficient means for cutting tire fabric into definite widths with speed and accuracy. Because of the manner in which the controlling system is arranged to first slow down the fabric as it approaches the position for a cut to be made, it is possible to stop the fabric precisely at the proper position for a cut to be made, even though the fabric is being fed to the machine at a relatively great speed, which would ordinarily preclude accurate stopping of the fabric at exactly the desired point, because of the relatively great inertia of the machine parts when moving at high speed.

The arrangement of the controlling system so that a new conveying and cutting cycle is initiated automatically as the operator removes the cut piece from the machine insures that the operation of the machine will correspond exactly to the operator's requirements for fabric, without necessity for operation of manual controls.

The means provided for adjusting the position of the cutting assembly carriage and the means for adjustment of the angle of the cutting mechanism with respect to the carriage may be operated conveniently, and make the machine capable of supplying fabric for a variety of requirements. The manner in which the angle changing means is interconnected with a width-of-cut indicator that automatically indexes to an appropriate width-of-cut scale as the angle is changed is particularly advantageous as it insures that the operator can conveniently determine the proper width setting without likelihood of mistake.

The further provision for rapid incremental adjustment of the width of cut, as by sliding sensing means, such as the photo switch assemblies, as a unit against the appropriate stops provided for this purpose, makes it possible for the operator to switch virtually instantaneously, without interrupting the operation of the machine, from one size of fabric to another.

The manner in which the conveyor for the fabric is provided with an offset section at the cutting station permits the cutting assembly to be accommodated conveniently in operative engagement with the fabric fed by the conveyor. The sliding guide assemblies for the offset section of the conveyor permit such offset section to be varied in position automatically as the angle of cut is changed.

A particularly advantageous feature of the invention lies in the provision of a flat cutting surface which makes the cut by crushing and severing the fabric against the surface of a cooperating anvil as described. This is made possible by constructing the blade in a longitudinally curved form, that is, in the form of a rocker or roller, which descends on the fabric with a rocking or rolling stroke so as to make pressurized contact with the fabric progressively from one end of the fabric to the other. Because of this rocking or rolling motion the area of fabric which is squeezed between the flat surface of the blade and the anvil at any given instant is relatively small and therefore the actuating mechanism is capable of exerting a relatively great unit pressure, sufficient to crush and break the tough textile cords of the fabric. The arrangement of actuating levers and tensioning means therefor is such that the pressure is substantially uniform throughout the stroke of the cutting blade. The use of such a flat blade obviates the necessity for frequent sharpening or replacement of the blade, and furthermore the mechanism does not tend to become fouled with the soft tacky, rubber stock from the fabric.

The provision of independent actuating linkages at each end of the cutting beam makes possible, by means of suitably located stops, such as the stops 182 and 183, the lifting of the cutting beam away from the anvil at the end of the cutting stroke so that the fabric may pass along freely.

The adjustable tensioning means connecting the actuating linkages at each end of the machine makes it possible to produce a desired cutting pressure without necessity for variation of the pressure in the actuating cylinder.

The manner in which the cutting blade is removably supported on the working face of the cutting beam makes it convenient to replace the blade when necessary. The provision of a blade having a polygonal cross-section, such as the square cross-section shown, makes it possible to provide a plurality of cutting surfaces, one at each corner of the polygon, on the one blade, each of such surfaces being utilizable in turn as the other wears out. The square or other polygonal cross-section makes for a strong blade capable of withstanding the relatively great pressures applied, even though the working face of the blade is relatively narrow. The manner in which the blade is nested in a recess in the working surface of the cutting beam insures that the blade will be properly supported against distortion cr fracture from the high pressures applied during the cutting strokes.

The provision of a rotary anvil for cooperating with the cutting blade has the advantage that after a cut is made and it is desired to advance a new length of fabric into position for another cut, the anvil may be rotated in such direction as to aid in the advancement of the fabric. Furthermore, there is some tendency for the tacky fabric to adhere to the surface of the anvil, and rotation of the anvil overcomes this, permitting the fabric to be advanced without wrinkling or buckling. Since the anvil is round, any portion of its surface may be utilized as the working surface and the degree of rotation of the anvil after each cut may be such that a different portion of the anvil surface is presented to the cutting blade at each stroke. This minimizes wear of the anvil by distributing the wear evenly over the entire surface thereof.

The manner in which the anvil is lifted from its supporting beam, as by the compression spring shown, when the cutting blade is not in engagement with the anvil, and the manner in which the cutting blade is lifted from the anvil at the completion of its stroke, permit convenient rotation of the anvil. The curved surface in the supporting face of the anvil beam, corresponding in curvature to the curvature of the anvil, and in which the anvil is snugly nested as the cutting blade descends, serves to support the anvil firmly in its proper position throughout the cutting stroke without any tendency for lateral displacement.

Because of the manner in which the cutting beam is positively guided and steadied in its rocking movement by cam structures cooperating with each end of the beam, the cutting stroke may be made rapidly with great accuracy and reproducability.

By driving the conveyor at a slightly greater linear speed than the speed at which the fabric is fed to the machine, as described, the fabric is fed without formation of wrinkles or folds, so that accurate cuts are made.

Having thus described my invention, what I claim and desire to protect by Letters Patent is:

1. A cutting mechanism comprising in combination a beam, a curved blade on the working surface of said beam, said blade having a flat cutting surface, a coperating anvil disposed below said beam for backing up a material to be cut, separate actuating means at each end of said anvil interconnected with each end of said beam, the actuating means at one end of the beam acting to raise said one end while the actuating means at the other end simultaneously acts to lower said other end to bring the flat cutting surface of the blade against the anvil with uniform pressure progressively from one end of the anvil to the other with a rolling stroke.

2. A cutting mechanism comprising in combination a beam, a curved blade in the working surface of said beam, said blade having a flat cutting surface, a cooperating anvil disposed below said beam for backing up a material to be cut, separate actuating cylinders at each end of said anvil, separate pivotal interconnections between said cylinders and each end of the cutting beam, the cylinder at one end of the anvil acting to raise one end of the beam from the anvil while the cylinder at the other end of the anvil simultaneously acts to lower the other end of the beam toward the anvil to bring the flat cutting surface of the blade against the anvil with uniform pressure progressively from one end of the anvil to the other with a rolling stroke, a resilient tensioning interconnection between the separate pivotal interconnections at each end of the anvil, and means for adjusting the tension in said resilient inter connection to vary the pressure of the cutting surface on the anvil.

3. A cutter for rubberized fabric including in combination a cutting blade, a round anvil cooperating with said cutting blade, means for moving the cutting blade towards and away from the anvil to make a cut, a supporting beam engageable with said anvil for backing up said anvil during the cut, means for lifting said anvil out of engagement with said supporting beam when said blade moves away from said anvil subsequent to a cut, and means for rotating said anvil.

4. A bias cutter comprising in combination a conveyor for feeding a material to be cut in a definite plane, a carriage movable longitudinally of the conveyor, a cutting assembly pivotally mounted on said carriage for angular movement with respect to said carriage, said cutting assembly including an anvil structure extending longitudinally of said carriage and disposed below the plane of the conveyor guide, cam structures toward each end of the carriage extending upwardly from said anvil structure, a cutting beam having a curved cutting edge, said cutting beam being supported above the plane of the conveyor between said guide cam structures with the ends thereof in engagement with said guide cam structures whereby movement of said cutting beam is guided by said cam structures, and actuating cylinders and actuating levers pivotally interconnected to said cutting beam and to said anvil structure for simultaneously raising one end and lowering the other end of the cutting beam to move said cutting beam with a rocking stroke over a path defined by said guide cam structures.

5. A bias cutter comprising in combination a variable speed conveyor for feeding a length of fabric to be cut composed of a plurality of parallel conveyor bands, a carriage disposed transversely of said conveyor and adjustable in the direction of travel of said conveyor bands, a cutting assembly pivotally mounted on said carriage for angular movement with respect to the carriage, a plurality of guiding assemblies mounted on said carriage for sliding movement in the direction of travel of said conveyor bands for offsetting said conveyor bands to accommodate the cutting assembly, means on said guiding assemblies engaging said cutting assembly whereby said guiding assemblies are slidably adjusted as the angle of said cutting assembly is changed, said cutting assembly including a cutting beam extending longitudinally of said carriage, said beam having on its underside a cutting blade having a working surface which is longitudinally curved and substantially flat transversely in a plane parallel to the plane of the fabric to be cut, a cooperating anvil structure disposed below the cutting beam and including an anvil which is round in cross-section and rotatably supported, a supporting beam for backing up said anvil, actuating cylinders and actuating levers pivotally interconnected between said anvil structure and said cutting beam, said cutting beam being actuated by said actuating cylinders and levers to move the working surface of said blade against the working surface of said anvil progressively from one end of the blade to the other with a rocking stroke to crush and sever the fabric between the blade and the anvil, means for lifting said anvil from said supporting beam after a cut is made, and means for rotating said anvil.

6. A cutter for rubberized fabric including in combination a cutting blade, a round anvil cooperating with said cutting blade, means rotatably supporting said anvil at each end thereof, a supporting beam engageable with said anvil intermediate its ends during the cut, means for lifting said anvil out of engagement with said supporting beam when said cutting blade moves away from said anvil after the cut, and means for rotating said anvil.

References Cited in the file of this patent

UNITED STATES PATENTS

| | | |
|---|---|---|
| 133,783 | Kline | Dec. 10, 1872 |
| 160,607 | Mayer | Mar. 9, 1875 |
| 364,774 | Schmalz | June 14, 1887 |
| 389,529 | Robinson et al. | Sept. 11, 1888 |
| 575,821 | Blake | Jan. 26, 1897 |
| 1,184,076 | Cohn | May 23, 1916 |
| 1,252,137 | Mitchell | Jan. 1, 1918 |
| 1,448,723 | Brundage | Mar. 20, 1923 |
| 1,577,621 | Gammeter | Mar. 23, 1926 |
| 1,676,260 | Glidden | July 10, 1928 |
| 1,728,163 | Maas | Sept. 10, 1929 |
| 1,819,046 | Sullivan | Aug. 18, 1931 |
| 1,888,744 | Shook | Nov. 22, 1932 |
| 1,988,486 | Ferenci | Jan. 22, 1935 |
| 1,998,069 | Beutel | Apr. 16, 1935 |
| 2,071,097 | Wennberg et al. | Feb. 16, 1937 |
| 2,130,818 | Soderberg | Sept. 20, 1938 |
| 2,221,716 | Morton | Nov. 12, 1940 |
| 2,261,837 | Allen | Nov. 4, 1941 |
| 2,381,240 | Wicker et al. | Aug. 7, 1945 |
| 2,405,598 | Miller | Aug. 13, 1946 |
| 2,458,612 | Luzzato et al. | Jan. 11, 1949 |
| 2,558,398 | Tyler | June 26, 1951 |
| 2,581,937 | Secrest | Jan. 8, 1952 |

FOREIGN PATENTS

| | | |
|---|---|---|
| 83,136 | Germany | Oct. 1, 1895 |